(12) United States Patent
Schneider et al.

(10) Patent No.: US 10,850,341 B2
(45) Date of Patent: Dec. 1, 2020

(54) LOADING PIN FOR A JOINING DEVICE, JOINING DEVICE AND JOINING ELEMENT FEED METHOD

(71) Applicant: NEWFREY LLC, New Britain, CT (US)

(72) Inventors: Michael Schneider, Giessen (DE); Alexander Schug, Giessen (DE); Jochen Hain, Giessen (DE)

(73) Assignee: NEWFREY LLC, New Britain, CT (US)

( * ) Notice: Subject to any disclaimer, the term of this patent is extended or adjusted under 35 U.S.C. 154(b) by 482 days.

(21) Appl. No.: 15/627,937

(22) Filed: Jun. 20, 2017

(65) Prior Publication Data
US 2017/0361391 A1  Dec. 21, 2017

(30) Foreign Application Priority Data

Jun. 20, 2016 (DE) .................. 10 2016 111 283

(51) Int. Cl.
*B23K 9/20* (2006.01)
*B23K 11/00* (2006.01)

(52) U.S. Cl.
CPC .......... *B23K 9/202* (2013.01); *B23K 11/0053* (2013.01); *B23K 9/206* (2013.01)

(58) Field of Classification Search
CPC .... B23K 9/202; B23K 11/0053; B23K 9/206; B23K 9/201; B23K 9/20
USPC ..................................................... 219/98, 99
See application file for complete search history.

(56) References Cited

U.S. PATENT DOCUMENTS

| 4,019,013 | A | | 4/1977 | Spisak | |
|---|---|---|---|---|---|
| 4,629,857 | A | * | 12/1986 | Gauger | B23K 9/206 219/98 |
| 5,798,494 | A | * | 8/1998 | Aoyama | B23K 9/206 219/98 |
| 6,874,655 | B2 | * | 4/2005 | Aoyama | B23K 9/206 219/86.25 |
| 7,109,434 | B2 | | 9/2006 | Willerhausen | |
| 8,793,855 | B2 | * | 8/2014 | Hain | B23K 9/201 254/23 |
| 2003/0039532 | A1 | * | 2/2003 | Aoyama | B23K 9/206 414/27 |

FOREIGN PATENT DOCUMENTS

DE  8010343 U  3/1982

* cited by examiner

*Primary Examiner* — Geoffrey S Evans
(74) *Attorney, Agent, or Firm* — Michael P. Leary; Kofi A. Schulterbrandt (57) ABSTRACT

A loading pin, for a joining device, having a first axial end portion connectable to an axial drive, and having a second axial end portion which is realized for the purpose of exerting an axial force onto a joining element in order to push the joining element into a holding device and/or in order to support the joining element axially during a joining process, wherein the loading pin comprises an axial hollow channel portion through which a joining element is guidable in an axial feed direction. The loading pin partially defines a lateral joining element feed opening, via which a joining element is feedable into the hollow channel portion.

16 Claims, 4 Drawing Sheets

LOADING PIN FOR A JOINING DEVICE, JOINING DEVICE AND JOINING ELEMENT FEED METHOD

CROSS-REFERENCE TO RELATED APPLICATION

This application claims priority from German Patent Application No. 102016111283.6, filed on Jun. 20, 2016, the disclosure of which is incorporated herein by reference.

BACKGROUND OF THE INVENTION

The present invention relates to a loading pin for a joining device, having a first axial end portion which is connectable to an axial drive, and having a second axial end portion which is realized for the purpose of exerting an axial force onto a joining element in order to push the joining element into a holding device and/or in order to support the joining element axially during a joining process, wherein the loading pin comprises an axial hollow channel portion through which a joining element is guidable in an axial feed direction.

A loading pin of this type is disclosed in document DE 80 10 343 U1.

In addition, the present invention relates to a joining device having a joining element receiver which is connectable to a joining element feed device in such a manner that a fed joining element is transferred into a receiving channel, wherein the joining element receiver comprises a loading pin guide portion on which a loading pin is mounted so as to be axially displaceable between a feed position and a joining position.

Finally, the present invention relates to a method for feeding a joining element into a joining device.

In the area of joining technology, in particular in the area of joining elements to workpieces, such as, for example, in the case of stud welding or in the case of stud bonding, it is known to feed joining elements in an automated manner into a joining head. In this connection, individually separated joining elements such as studs are blown through a feed tube by means of compressed air toward the joining head. There they pass into the receiving channel.

The receiving channel leads into a feed channel of the joining head, a loading pin being mounted so as to be axially displaceable inside said feed channel. To feed a joining element out of the receiving channel into the feed channel, the loading pin is pulled back axially until the front end of the loading pin exposes the transition between the receiving channel and the feed channel. The joining element is then braked in a holding device which comprises holding tongues. The holding tongues are certainly radially resilient but have a relatively high level of rigidity. Accordingly, it is necessary to press the joining element through the holding device by means of the loading pin until, for example, a flange portion of a stud emerges at the front out of the holding device. The high level of rigidity of the holding tongues of the holding device is preferred because during stud welding the electric weld current is transmitted between the holding tongues and the stud by means of the pressing force.

These types of joining devices are known in general. In this connection, the loading pin has to complete a relatively large travel, in particular when the holding device is realized in an axially long manner in order also to be able to perform joining in places that are difficult to access. On account of the large amount of travel, a relatively large interference contour is created on the side of the joining device located axially opposite the holding device, as the loading pin has to be pushed back relatively far during a feed operation in order to expose the transition between the receiving channel and the feed channel or holding device.

A further method for welding studs is disclosed in document U.S. Pat. No. 4,019,013. In this connection, a holding device is mounted so as to be axially displaceable with reference to a housing. The holding device comprises a lateral feed channel, via which a joining element can be fed in the direction toward a holding device. The holding device then moves rearward against a fixed pin such that the fed stud is pushed into a predetermined position in the holding device. The axial travel is relatively large in this connection also.

Document DE 102 29 690 B4 discloses a holding device of a joining device where studs with a relatively large flange portion (in comparison to the shank portion) are also able to be fed in an automated manner, through a feed channel. The joining element is clamped in a joining position by an axially movable clamping mouth-piece being displaced against radially movable clamping elements in such a manner that a radial clamping force for holding the shank of the joining element is exerted onto the clamping elements.

Finally, document DE 80 10 343 U1 discloses a joining gun which comprises a fixed feed pipe through which joining elements are feedable in an axial feed direction by means of compressed air. At the end of the fixed pipe there is provided a one-way passage, through which a joining element is able to pass, but is not able to return into the feed pipe again. The feeding of a joining element is effected, in this case, at a point in time when a previously fed joining element, which is held by a stud clamping sleeve, is joined onto a workpiece. The stud emerging out of the one-way passage, in this case, is braked and stopped by the previously fed joining element. The stud clamp sleeve is then guided in the axial direction in the direction toward the one-way passage and then clamps the last fed joining element.

In the case of the joining devices of the prior art described further above, the axial installation length of the respective joining device is also relatively large, on account of the respective axial feed channel or feed pipe and the relatively complicated axial relative displaceability between the feed pipe and the clamping device.

BRIEF SUMMARY OF THE INVENTION

Against said background, it is an object of the invention to provide an improved loading pin for a joining device, an improved joining device and an improved method for feeding a joining element into a joining device.

The above object is achieved in the case of the loading pin named in the introduction by the fact that the loading pin comprises a lateral joining element feed opening, via which a joining element is feedable into the hollow channel portion.

In addition, the above object is achieved by a joining device of the above-named type wherein the loading pin is a loading pin according to the invention.

Finally, the above object is achieved by a method for feeding a joining element into a joining device of the type according to the invention, said method having the steps of feeding a joining element into the receiving channel of the joining element receiver and from there radially via the lateral joining element feed opening into the loading pin such that the joining element passes into the hollow channel portion of the loading pin.

As a result of the measure according to the invention, realizing the loading pin itself with a hollow channel and providing the loading pin, which is axially displaceable on the joining element receiver, with a lateral feed opening, it is possible to reduce the maximum necessary travel of the loading pin in a substantial manner. As the loading pin does not have to expose an outlet opening of a receiving channel of the joining element receiver completely as in the prior art such that the front end of the loading pin passes in the axial direction behind said outlet opening, the loading pin can remain arranged with its front end, which faces the holding device, still closely adjacent the holding device. On account of the lateral feed opening, the loading pin according to the invention consequently no longer has to be moved away over the entire axial distance up to the outlet opening of the receiving channel and beyond. This, in turn, makes it possible for significantly smaller interference contours to be realizable on the joining device in the region located axially opposite the holding device, such that the joining device is also suitable for applications where joining processes have to be carried out in areas that are difficult to access.

In addition, it is possible to realize a holding device so that it is axially relatively long and narrow such that areas that are difficult to access are also able to be joined, for example at the bottom of beading and the like.

The axial drive can be, for example, a pneumatic cylinder, but can also be an electric linear motor. The second axial end portion of the loading pin can be realized for the purpose of exerting an axial force onto a shank end of a shank portion of a joining element in order to press the joining element into the holding device or to support it axially during a joining process. As an alternative to this, it is possible, in particular in the case of so-called large flange studs, when the loading pin is designed with its second axial end portion for the purpose of exerting an axial force onto a top surface of the flange portion of such a stud in order to press said stud into a position in the holding device and/or to support it axially during a joining process.

The joining element feed opening is a radial opening which preferably merges via a guide contour into the axially aligned hollow channel portion. This makes it possible for the joining element to be able to be fed from the receiving channel into the loading pin in the manner of a closed channel such that joining elements can be prevented from twisting and, for example, from being inadvertently joined in the incorrect axial alignment.

The object is consequently fully achieved.

According to a preferred embodiment, a one-way passage for joining elements is realized on the second axial end portion, through which one-way passage at least one portion of a joining element is able to emerge in the axial feed direction, but through which one-way passage the portion of the joining element is not able to return into the hollow channel portion in the opposite axial direction.

The one-way passage can be formed in different ways, for example as an active one-way passage which, by means of an actuator, enables passage in one direction, but prevents it in the other direction.

It is particularly preferred when the one-way passage is realized as a mechanical one-way passage, in particular as a passive one-way passage.

The achievement here is that the one-way passage can be realized in a structurally simple manner.

In addition, it is preferred when the one-way passage is itself realized for the purpose of being able to transmit an axial force onto the joining element or onto a portion of the joining element.

The one-way passage can be realized for the purpose of generally allowing the entire joining element through in the one direction, but not in the other one. In an alternative, it can be realized for the purpose of allowing a portion of the joining element, such as an enlarged flange portion, to pass through the one-way passage, but not in the opposite direction.

According to a particularly preferred embodiment, the one-way passage is formed by a plurality of radially resilient lugs which, when at least one portion of a joining element passes through the one-way passage, are deflected radially and/or which, after the at least one portion of the joining element has passed through, are restored radially resiliently in a blocking position.

The lugs of such a one-way passage are preferably arranged distributed over the periphery concentrically to a longitudinal axis of the loading pin. Proceeding from a base portion of the loading pin, the lugs can extend in the axial direction such that they taper conically towards one another, forming an axial end of the loading pin, via which the axial force is then to be transmitted. For this purpose, thickenings or radial projections, which provide an enlarged support area on the joining element, either on the shank end thereof or on the flange portion thereof, can be realized on the axial free ends of the lugs.

In addition, the lugs can be formed curved in cross section such that they obtain a certain rigidity in the axial direction in order to be able to transmit the axial force via the lugs.

Accordingly, it is preferred when the lugs are realized such that in the blocking position they are able to transmit an axial force.

In addition, it is preferred overall when the axial hollow channel portion is defined/limited by a guide contour in a region of the lateral feed opening.

The guide contour, which can be formed by a base portion of the loading pin, is realized in particular for the purpose of guiding a fed joining element from a generally radial feed direction via the lateral feed opening into an axial direction, i.e., in the direction of the axial feed direction. The guide contour is preferably realized on an end of the hollow channel portion that faces the first axial end portion. When the loading pin is situated in a feed position in a joining device, the guide contour is aligned preferably with a guide contour of a receiving channel of a joining element receiver or is arranged flush with said joining element receiver, on which such a loading pin is mountable so as to be axially displaceable.

The guide contour ensures that a fed joining element maintains its relative position with reference to the feed direction, that is to say does not twist or tilt in any other way at the transition from a joining element receiver into the hollow channel portion of the loading pin. Faults can be prevented from occurring during the feed in this manner. In addition, a joining element can be prevented from being joined to a workpiece in an incorrect manner. A further advantage is that shorter studs are able to be processed and/or that air consumption during the feed process is reduced.

In the case of the joining device according to the invention, it is preferred when a maximum travel of the loading pin is smaller than 1.5 times the maximum length of an axial joining element.

The axial joining element maximum length is the longest axial length of a set of joining elements which can be joined by means of the joining device. For example, joining elements of various axial lengths can be joined by means of such a joining device. The joining element maximum length is the length of the longest joining element of such a set of joining elements. A maximum travel of the loading pin travel is preferably smaller than the axial length of the holding device.

Since, as mentioned in the introduction, the second end portion of the loading pin can be arranged closely adjacent to a joining element holding device in the axial direction on account of the lateral feed opening, the maximum travel can consequently be very small.

The maximum travel also determines the interference contour of the joining device on the end of the joining device which faces the first axial end portion, and which can consequently be realized very small.

In addition, it is advantageous overall when a joining element holding device, which comprises a plurality of radially resilient holding tongues, is mounted on the joining element receiver.

The holding tongues of the holding device can be realized in general so as to taper substantially conically in such a manner that a portion of a joining element that is guided through the one-way passage of the loading pin is, as a rule, stopped by means of the holding device.

The radial resilience of the holding tongues is preferably clearly less than the radial resilience of the lugs of a one-way passage. The levels of resilience, in this case, are preferably matched such that a joining element that is fed at a certain kinetic energy passes with at least one portion thereof through the one-way passage, the lugs of the one-way passage being widened in a radially resilient manner and then springing back again into a blocking position. In addition, the levels of resilience are matched to one another such that at the predetermined kinetic energy of the joining element, said portion of the joining element is precisely not able to pass through the holding device, but is preferably stopped by said holding device.

When stud welding, an electric weld current is preferably transmitted by means of the radially resilient holding tongues.

In addition, the plurality of radially resilient holding tongues can include in each case three axial portions. A first axial portion, in this case, is preferably adjacent to the joining element receiver and comprises a greater inside diameter than the maximum outside diameter of the joining element. A second axial portion is arranged on the free end of the holding tongues and is aligned in a substantially axial manner such that in said second axial region, the holding tongues are able to abut, over a large distance and a large surface, against a shank or against an assembly located therebetween in order to reduce electric contact resistance in this manner. A third axial portion can be located between the first and the second axial portion and is realized in a substantially conical manner, preferably having a cone gradient which makes it possible, for example, for a flange portion of a stud to widen the holding tongues radially in the case of a relative axial movement with respect to said holding tongues such that the flange portion is able to pass through until the second axial portion abuts against the shank of the stud.

As an alternative to this, the plurality of radially resilient holding tongues can also be realized in a similar manner to clamping tongues as are described in document DE 102 29 609 B4, the disclosure content of which is to be included by reference in the present case.

It is particularly advantageous when a one-way passage of the loading pin and the joining element holding device are arranged in such a manner with reference to one another that a joining element is conveyable completely through the hollow channel portion and through the one-way passage and is stoppable in an intermediate position by the holding tongues.

In the case of said development, the lugs of the one-way passage preferably snap back into a blocking position in which they are then able to exert an axial force onto an end of a shank of the joining element.

It is additionally advantageous, in this connection, when the joining element holding device is realized for the purpose of holding a joining element in a joining position as a result of the holding tongues directly abutting radially against the joining element.

Said embodiment has already been described above. The direct radial abutment is realized then in a preferred manner by the above-described second axial portion of the holding tongues.

In an alternative development, a one-way passage of the loading pin and the joining element holding device are arranged in such a manner with reference to one another that a flange portion of the joining element is conveyable through the hollow channel portion and through the one-way passage and is stoppable by the holding tongues.

In the case of said development, in said intermediate position a shank of the joining element is preferably still located in the radial direction between the lugs of the one-way passage.

The blocking position is set up in this connection as a result of the lugs of the one-way passage snapping back again into a blocking position in which they are then able to exert an axial force onto the top surface of said flange portion.

In the case of said development, it is additionally advantageous when the joining element holding device is realized for the purpose of holding a joining element in the joining position by the holding tongues pressing from radially outside onto lugs of a one-way passage of the loading pin.

In the case of said development, advancing the loading pin from the feed position into the joining position of the loading pin can preferably result in the lugs of the one-way passage pressing axially onto the flange portion of a joining element and pressing the flange portion through the holding tongues of a holding device. In addition, the holding tongues of the holding device then abut radially outwardly against the lugs of the one-way passage.

For example, an electric weld current can be transmitted in this connection onto the joining element via the holding tongues and the lugs.

An articulated sleeve, which provides that where there is relative movement, a sufficient radial clamping force is able to be exerted onto the lugs of the one-way passage, can additionally be arranged in a radial region between the lugs and holding tongues.

In addition, it is overall advantageous when the loading pin comprises a one-way passage with a plurality of radially resilient lugs, as has already been mentioned above.

It is also overall advantageous when the loading pin guide portion has a guide cross section at least in portions, wherein the loading pin has a loading pin cross section at least in portions which is adapted to the guide cross section.

The guide cross section and the load pin cross section can be circular in form. In many cases, however, it is preferred when said cross sections deviate from a circular form, for example in the form of a polygonal cross section. In said case, an alignment of the lateral feed opening can be realized in a simple manner in the peripheral direction with an outlet opening of a receiving channel.

In addition, it is possible in this case to transmit torque from the joining element receiver onto the loading pin and vice versa.

The maximum travel of the loading pin is preferably independent of the size of the joining element receiver and preferably independent of the length of the joining element holding device, in particular of the length of the radially resilient holding tongues.

The maximum travel of the loading pin is preferably a function of a length of the above-described second portion and of the length of the above-described third portion of holding tongues of a joining element holding device. Preferably, the maximum travel of the loading pin is also independent of the length of the joining element, but is preferably smaller than a maximum length of the axial joining element.

In the case of joining elements which have a relatively small ratio of flange diameter to shank diameter, the embodiment preferred is where the joining element overall passes through the one-way passage and then passes between an axial end of the one-way passage and the holding tongues to an intermediate position. In the case of so-called large flange studs which have a relatively large ratio of flange diameter to shank diameter, the variant preferred is preferably where the lugs of the one-way passage are closed into a blocking position in which they are subsequently able to transmit an axial force onto a top surface of the flange portion.

All in all, at least one of the following advantages are produced, where applicable, in the case of the above embodiments. The size of a drive unit, in particular of an axial drive, is independent of the size of a joining element receiver. The size of such a drive unit is preferably independent of the length of a joining element holding device. In particular, extra-long joining element holding devices are realizable, e.g., for weld positions in beading, indentations, undercuts, etc.

In the case of overhead joining, for example after a malfunction in a power for feeding the joining elements, for example in the case of a blast air malfunction, it is no longer possible for a joining element to pass back into a shooting channel or a feed channel or into a receiving channel.

It is obvious that the features named above and the features yet to be explained below are usable not only in the combination provided in each case, but also in other combinations or standing on their own without departing from the framework of the present invention.

BRIEF DESCRIPTION OF THE SEVERAL VIEWS OF THE DRAWINGS

Exemplary embodiments of the invention are explained in more detail in the following description and are shown in the drawings.

DETAILED DESCRIPTION OF THE PREFERRED EMBODIMENTS

Figure 1:
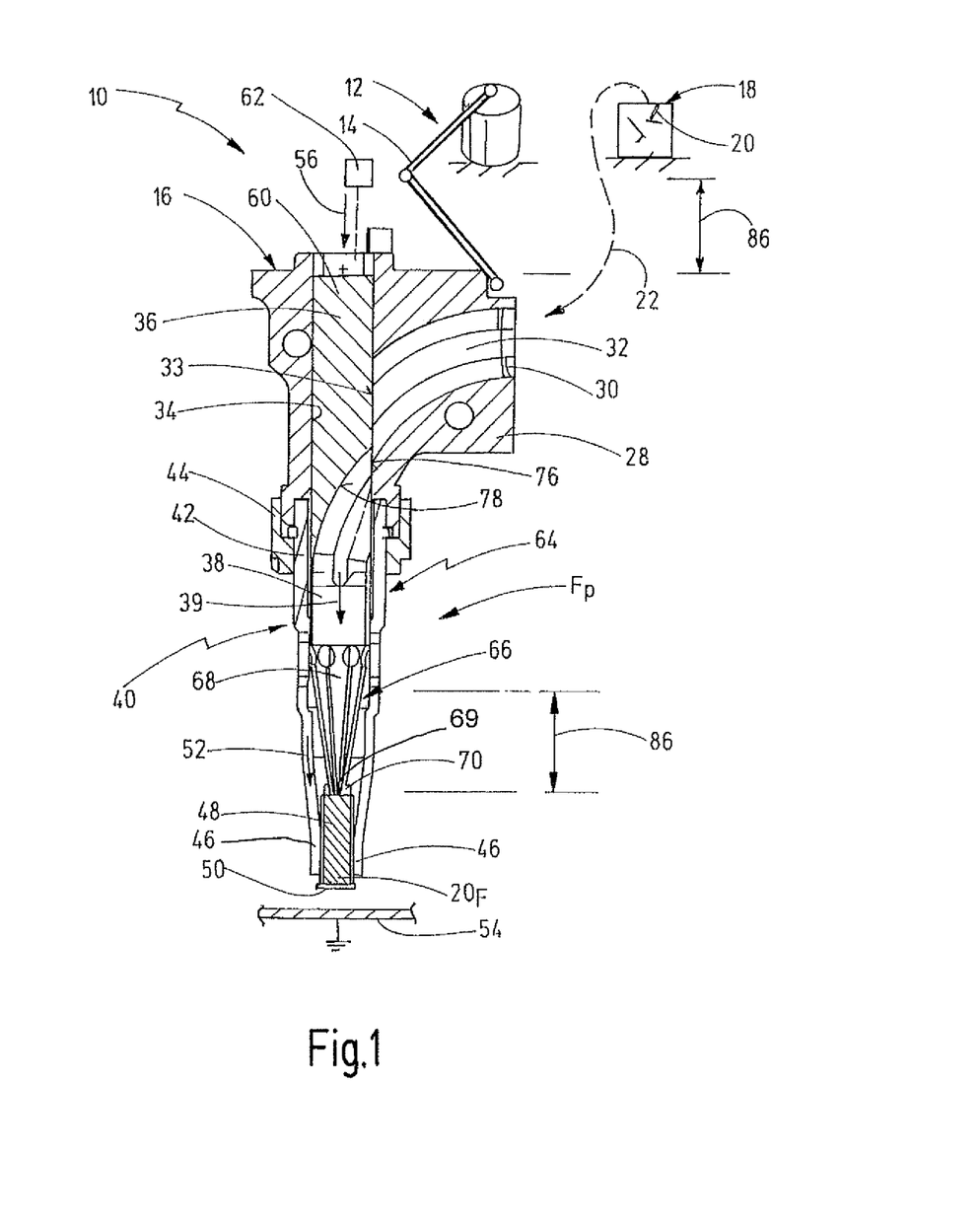
FIG. 1 shows a schematic longitudinal sectional view through a first embodiment of a joining device with a loading pin according to the invention in a joining position.

FIG. 1 shows a schematic representation of a joining system which is designated in general with the reference 10. As an example, the joining system 10 includes a robot 12 which, on a three-dimensionally freely movable arm 14, carries a joining head 16 which forms a joining device.

The joining system 10 additionally includes a feed device 18 which is realized for the purpose of feeding individually separated joining elements 20, which can be realized in the present case as studs with a shank portion 48 and a flange portion 50, to the joining head 16 by means of a feed tube 22, in an automated manner. The feeding can be effected, for example, by means of a blast of pressurized air.

The joining head 16 comprises a joining element receiver 28. A receiving opening 30, to which the feed tube 22 can be connected and via which joining elements can be fed, preferably with the flange portion in the front, is realized on the joining element receiver 28, which is preferably realized fixed to the housing with reference to the joining head 16.

The receiving opening 30 merges into a curved receiving channel 32 of the joining element receiver. The receiving channel 32 ends in an outlet opening 33 which opens out into a loading pin guide portion 34. A loading pin 36 is mounted in the loading pin guide portion 34 so as to be axially displaceable with reference to the joining element receiver 28.

The loading pin includes an axial hollow channel portion 38 in which joining elements are fed in an axial feed direction 39.

The joining head 16 further includes a joining element holding device 40 which is secured to the joining element receiver 28 by means of a fastening device 42, for example in the form of a fastening nut 44.

In the present case, the holding device 40 includes a plurality of holding tongues 46 which are arranged distributed over the periphery and comprise a first axial portion, which faces the joining element receiver 28 and comprises an inside diameter $D_{ID1}$ which is greater than a maximum outside diameter $D_{ODM}$ of a joining element 20 to be fed.

On one free end 47, the holding tongues 46 comprise in each case a second axial portion where the holding tongues are aligned in a substantially straight manner and which, in a relaxed position, that is to say not deflected radially, define an inside diameter $D_{ID2}$ which is smaller than an outside diameter $D_{ODS}$ of a shank portion of a joining element 20. A third axial portion of the holding tongues, which is realized in a substantially conical manner, and which is realized as a stop portion, as will be explained again below, is located in between.

As explained, the joining element 20 comprises a shank portion 48 and a flange portion 50 with a larger diameter.

In the joining position shown in FIG. 1, such a joining element 20 is shown in a joining element joining position 20F in which the shank portion 48 is surrounded by the second axial portion of the holding tongues 46 which press radially against the shank portion 48. The flange portion 50 and part of the shank portion can protrude in relation to the radial end of the holding device 40.

An electric weld current 52 can be transmitted by the holding device 40 and is then transmittable via the holding tongues 46 onto the shank portion 48. As a result, in a manner known per se, such a joining element 20 can be joined during so-called stud welding onto a top surface of a workpiece 54 (for example a metal sheet), which preferably forms an opposite pole, for example an earth for the electric weld current, such that an electric arc can be drawn for stud welding between the joining element 20 and the workpiece 54.

It can be seen additionally in FIG. 1 that an axial force 56, which is directed in the same direction as the axial feed direction 39, can be exerted onto the loading pin 36.

Figure 2:
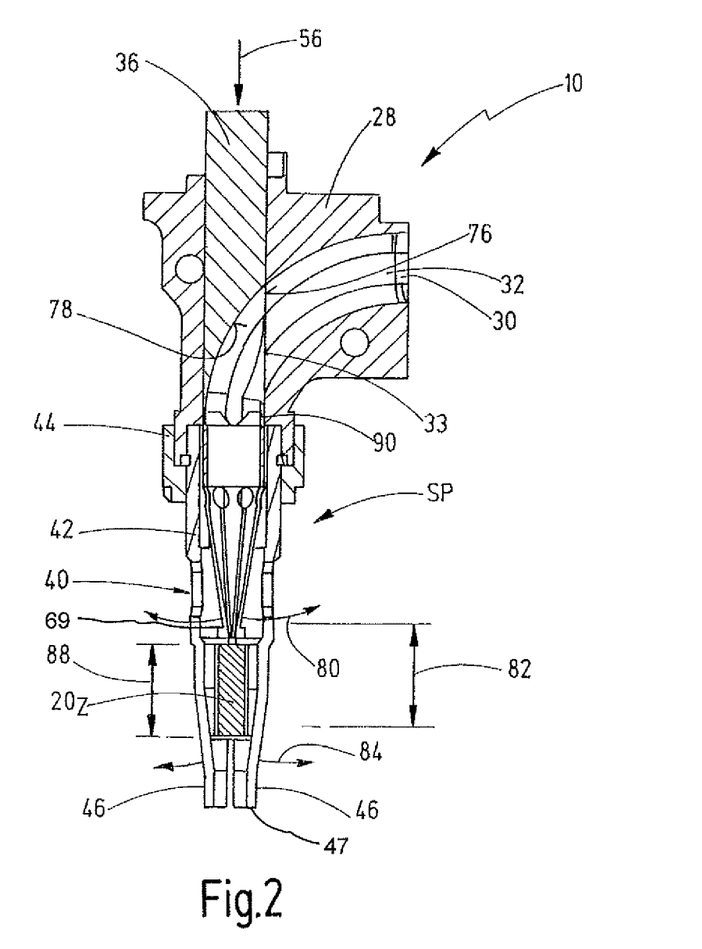
FIG. 2 shows the joining device of FIG. 1 in a feed position in which a joining element is situated in an intermediate position.

For this purpose, for example a first axial end portion 60 of the loading pin 36 can be connected to an axial drive 62, by means of which the loading pin 36 is movable axially relative to the joining element receiver 28 between the joining position FP shown in FIG. 1 and the feed position SP shown in FIG. 2.

A second axial end portion 64, on which a mechanical one-way passage 66 is provided, is realized on an axial end of the loading pin 36 which is located opposite the first axial end portion 60. The one-way passage 66 is formed by a plurality of lugs 68, which are arranged distributed over the periphery, connect to the hollow channel portion 38 and, proceeding from there, taper conically in the feed direction. On their free ends 69, the lugs 68 can comprise respective radial projections 70 or thickenings such that the lugs 68 are able to abut against a shank end of the shank portion 48 and the axial force applied onto the loading pin 36 can be transmitted onto the joining element 20, as is shown in FIG. 1.

The loading pin 36 comprises a lateral joining element feed opening 76. The lateral joining element feed opening 76 is realized in the axial direction between the first and the second axial end portions 60, 64 and in the feed position SP shown in FIG. 2 is aligned with the outlet opening 33 of the receiving channel 32.

In said region, the loading pin 36 comprises a guide contour 78 which is in alignment with a guide contour of the receiving channel 32 when the loading pin 36 is situated in the feed position SP.

The guide contour 78 consequently forms a continuation of the receiving channel 32 and leads to a type of closed channel between the receiving channel 32 and the hollow channel portion 38 in such a manner that joining elements 20 are not able to rotate or tip in the region of the transition between the receiver 28 and the loading pin 36.

The receiving channel 32 and the guide contour 78 together form a curved contour in order to align joining elements 20, which are fed substantially in the radial direction into the loading pin 36 by means of the lateral joining element feed opening 76, ultimately in an axial manner such that in the hollow channel portion 38 they are guided in axially the feed direction 39.

During the feeding process, the joining elements 20 are fed at a certain kinetic energy, for example by means of blast air. During the feeding process, on account of their kinetic energy, the joining elements 20 press the lugs 68 radially outward, which is shown in FIG. 2 by the reference 80, such that the joining element 20 passes completely through the one-way passage 66 and is braked by means of the holding tongues 46 of the holding device 40, in an intermediate position 20Z in which the joining element 20Z is situated in the axial direction between the one-way passage 66 and the free end 47 of the holding tongues 46.

Said intermediate position region is shown in FIG. 2 by way of the reference 82.

The loading pin 36 is then guided out of the feed position SP into the joining position FP in which the loading pin 36 exerts an axial force 56 onto the joining element 20 by use of the one-way passage 66 via lugs 68 with radial projections 70 in order to press said joining element 20 through the holding tongues 46 until the position shown in FIG. 1 is reached. In this connection, the holding tongues 46 of the holding device 40 also perform a radial movement which is shown in FIG. 2 by way of the reference 84.

FIGS. 1 and 2 also show the maximum travel 86 of the loading pin 36. It can be seen that said travel 86 can be smaller than 1.5 times a maximum length 88 of a joining element 20.

Only a very small interference contour is created in the region of the first axial end portion 60 on account of the small travel 86 such that it is also possible to use the joining head 16 in difficult joining situations.

In addition, the holding device 40 can be realized so as to be long in the axial direction, as is also shown in FIG. 2, such that the joining head 16 can also be used for joining at inaccessible places, for example at the bottom of beading or the like.

FIG. 2 shows a schematic representation of an insulation sleeve 90 which is able to insulate the loading pin 36 electrically in relation to the holding device 40 in order to avoid an electric weld current 52 also being transmitted onto the joining element via the one-way passage 66.

Figure 3:
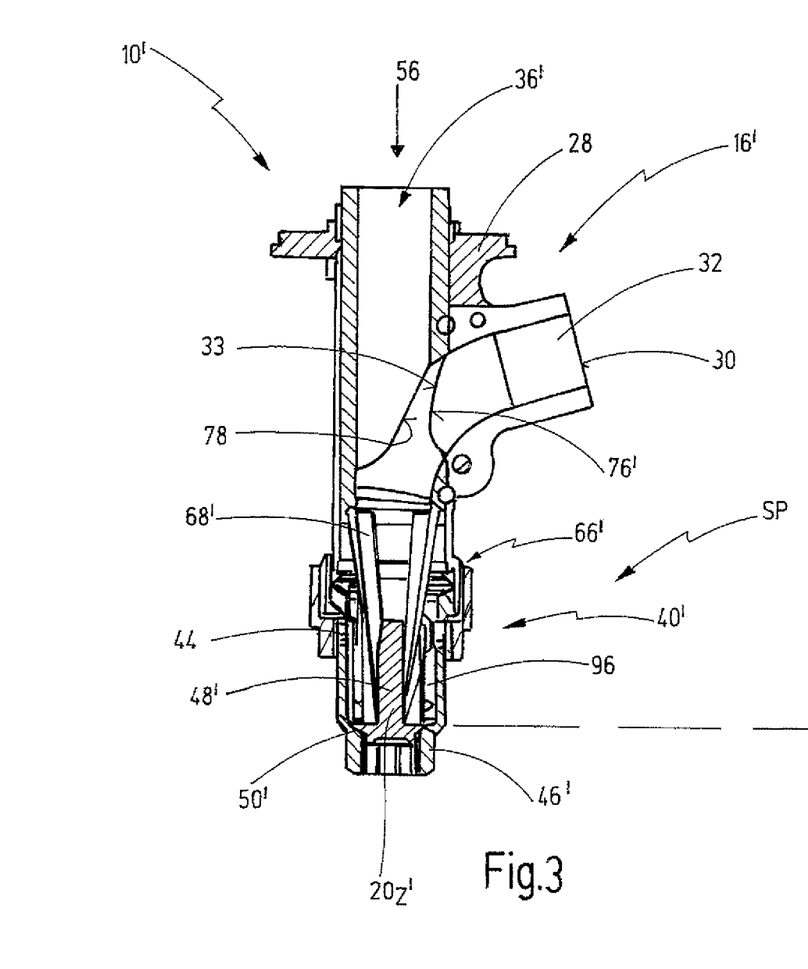
FIG. 3 shows a schematic representation, comparable to FIG. 2, of a further embodiment of a joining device in a feed position, a joining element being situated in an intermediate position.
Figure 4:
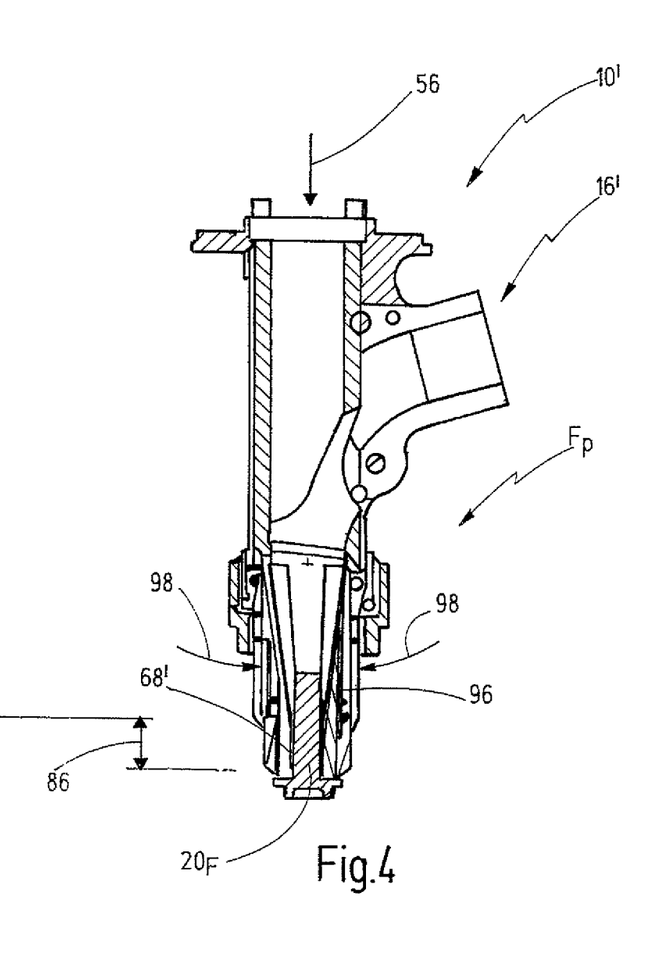
FIG. 4 shows the joining device of FIG. 3 in a joining position in which a joining element is situated in a joining position.

FIGS. 3 and 4 show a further embodiment of a joining system 10' having a joining head 16' which comprises a loading pin 36'. The embodiment in FIGS. 3 and 4 corresponds in general with regard to design and method of operation to the embodiment in FIGS. 1 and 2. Identical elements are consequently provided by identical references. Substantially the differences are explained below.

The difference in the present case is substantially in the region of the holding device 40'. The holding device 40' is realized for the purpose of being able to widen the holding tongues 46' relatively far in order, in this way, also to be able to join joining elements 20' where the ratio of flange portion 50' to shank portion 48' is very large, in particular in the form of so-called large flange studs.

In this connection, the one-way passage 66' is initially realized such that a fed joining element is not fed completely through the one-way passage 66', but only the flange portion 50' thereof which is then subsequently stopped by the holding tongues 46', in the intermediate position 20Z' shown in FIG. 3.

The lugs 68' of the one-way passage 66', where applicable, rest against a top surface of the flange portion 50'. When the axial movement (axial force 56) is executed, said lugs 68' consequently press onto the flange portion and press it through the holding tongues 46' until the flange portion 50' protrudes out of the holding device 40'.

The holding tongues 46', in this case, abut radially outwardly against the lugs 68'.

Figure 5:
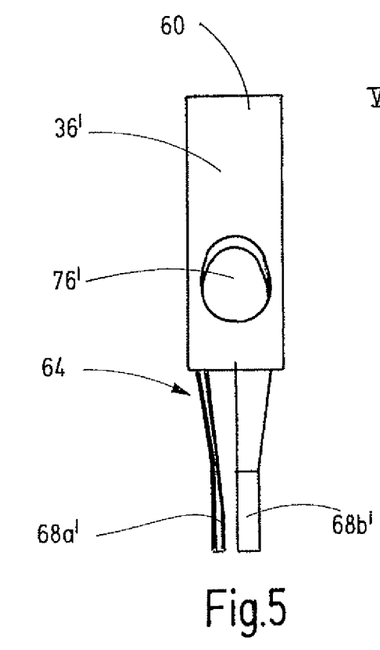
FIG. 5 shows a side view of a loading pin of the joining device of FIGS. 3 and 4.
Figure 6:
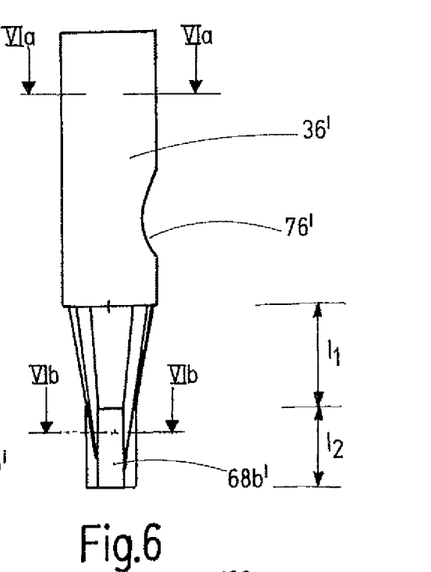
FIG. 6 shows a side view of the loading pin of FIG. 5 rotated by 90°.

An articulated sleeve 96, which, during the relative movement between the loading pin 36' and the holding device 40', provides that clamping force 98 is exerted in the radial direction such that it can be ensured that an electric weld current experiences a small amount of contact resistance, is arranged in the region of the holding device 40' in order to obtain a sufficient radial clamping force FIGS. 5 and 6 show the loading pin 36' from the joining device 16' of FIGS. 3 and 4. The lateral joining element feed opening 76' and the lugs, which are provided in FIGS. 5 and 6 with the references 68a' and 68b', can be seen.

The lugs 68' of the loading pin 36', in this connection, are not realized in a constantly conical manner as in the case of the embodiment in FIGS. 1 and 2, but comprise a first axial portion I1, in which they are realized in a conical manner, and a second axial portion I2, in which they are realized in a straight manner, in order to enable a large-surface abutment against the shank portion 48'.

Figure 6A:
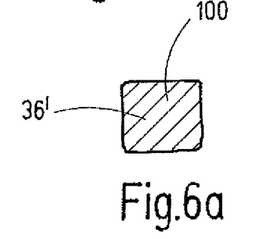
FIG. 6a shows a schematic sectional view along the line VIa-VIa of FIG. 6.

FIG. 6a shows a cross section of the loading pin 36' in the form of a loading pin cross section 100 which, in the present case, is realized in a polygonal manner. Accordingly, it can be ensured that a correspondingly polygonal cross section of the loading pin guide portion 34 is able to provide an anti-rotation device between the joining element receiver 28 and the loading pin 36 such that it is also possible to absorb torque therebetween.

Figure 6B:
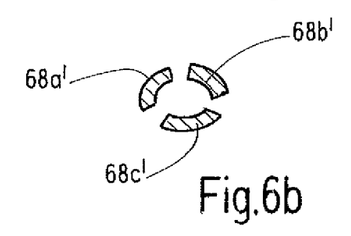
FIG. 6b shows a schematic sectional view along the line VIb-VIb of FIG. 6.

FIG. 6b shows additionally that the lugs 68a', 68b', 68c' can be realized in each case curved in cross section in order to be able to transmit axial forces well and in order to enable a large-surface abutment against the shank portion 48'.

Figure 7:
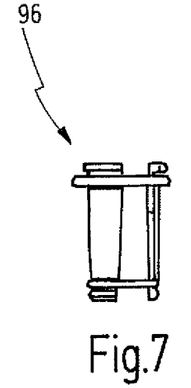
FIG. 7 shows a side view of an articulated sleeve of the joining device of FIGS. 3 and 4.
Figure 8:
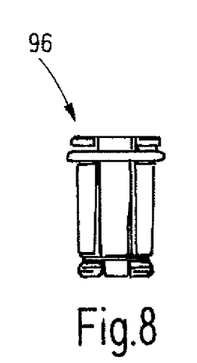
FIG. 8 shows a further side view of the articulated sleeve of FIG. 7.
Figure 9:
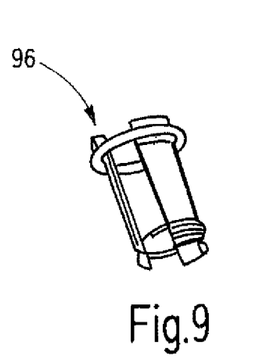
FIG. 9 shows a perspective view of the articulated sleeve of FIGS. 7 and 8.

FIGS. 7 to 9 show the articulated sleeve 96 of the holding device 40' in FIGS. 3 and 4. It can be seen that the articulated sleeve comprises a plurality of radially movable, substantially elongated members which are arranged distributed over the periphery and are held together by means of resilient means, for example by an O-ring seal.

The members are realized in each case such that, where there is a relative movement between the loading pin 36' and the holding tongues 46', they exert a radial clamping force 98 onto the lugs 68 so that they are able to abut tightly and at sufficient force against the shank portion 48'.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A loading pin for a joining device with an axial drive, the loading pin operable for exerting an axial force onto a joining element in order to push the joining element into a holding device or to support the joining element axially during a joining process, the loading pin comprising:
   a first axial end portion connectable to the axial drive;
   a second axial end portion opposite the first axial end portion;
   an axial hollow channel portion partially defined in the loading pin and open towards the holding device and through which the joining element is guidable in an axial feed direction toward the holding device,
   a lateral feed opening, defined in a radial side of the loading pin between the first axial end portion and the second axial end portion, and through which the joining element is feedable into the hollow channel portion.

2. The loading pin according to claim 1 further comprising a one-way passage located on the second axial end portion, and through which one-way passage a first portion of a joining element is able to emerge in the axial feed direction, but through which one-way passage the first portion of the joining element is not able to return into the hollow channel portion in an axial direction opposite to the feed direction.

3. The loading pin according to claim 2, wherein the one-way passage is a passive one-way passage.

4. The loading pin according to claim 2 wherein the one-way passage is partially defined by a plurality lugs, and each lug has a radially resilient free end, and the radially resilient free ends are deflectable between a radially inward blocking position and a radially outward second position in which second position the first portion of the joining element passes through the one-way passage.

5. The loading pin according to claim 4, wherein the blocking position the lugs are operable to transmit the axial force to the joining element in the holding device.

6. The loading pin according claim 1, wherein the loading pin additionally partially defines a guide contour between and connecting the lateral feed opening and the axial hollow channel portion.

7. A joining device for setting a joining element supplied from a joining element feed device, the joining device comprising:
   a joining element receiver partially defining a receiver channel operable for guiding the joining element, and further partially defining an axially extending loading pin guide;
   an axial drive;
   a holding device operable to support the joining element axially during a joining process
   a loading pin, mounted in the loading pin guide so as to be axially displaceable between a feed position and a joining position and operable for exerting an axial force onto the joining element in order to push the joining element into the holding device, the loading pin including:
      a first axial end portion connectable to the axial drive;
      a second axial end portion opposite the first axial end portion;
      an axial hollow channel portion partially defined in the loading pin and open towards the holding device and through which the joining element is guidable in an axial feed direction toward the holding device,
      a lateral feed opening, defined in a radial side of the loading pin between the first axial end portion and the second axial end portion, and through which the joining element is feedable into the hollow channel portion.

8. The joining device according to claim 7, whererin a maximum travel distance of the loading pin is smaller than a maximum axial length of a joining element.

9. The joining device according to claim 7, whererin the holding device at a first axial end is mounted on the joining element receiver, and at a second axial end the holding device further includes a plurality of radially resilient holding tongues.

10. The joining device according to claim 9, wherein the loading pin further includes a one-way passage connected to the axial hollow channel portion, and the one-way passage comprises a plurality of radially resilient lugs with free ends in the axial feed direction.

11. The joining device according to claim 10, wherein the loading pin and the holding device are connected so that a joining element is conveyable completely through the hollow channel portion and through the one-way passage and is stoppable in an intermediate position by the holding tongues.

12. The joining device according to claim 10, wherein the holding device is operable for holding the joining element in the joining position by the holding tongues pressing from radially outside onto the lugs of the one-way passage of the loading pin.

13. The joining device according to claim 10, wherein the one-way passage of the loading pin and the holding device are arranged in such a manner with reference to one another that a flange portion of the joining element is conveyable through the hollow channel portion and through the one-way passage and is stoppable in an intermediate position by the holding tongues.

14. The joining device according to claim 9, wherein the holding device is operable for holding the joining element in the joining position by the holding tongues radially abutting directly against the joining element.

15. The joining device according to claim 7, wherein the loading pin guide portion has a guide cross section, and the loading pin has a loading pin cross section operable for axial movement within the guide cross section.

16. Method for feeding a joining element into a joining device, the method comprising the steps of:
  providing a joining device comprising:
    a joining element receiver partially defining a receiver channel operable for guiding the joining element, and further partially defining an axially extending loading pin guide;
    an axial drive;
    a holding device operable to support the joining element axially during a joining process
    a loading pin mounted in the loading pin guide so as to be axially displaceable between a feed position and a joining position and operable for exerting an axial force onto the joining element to push the joining element into the holding device, the loading pin including:
      a first axial end portion connectable to the axial drive;
      a second axial end portion opposite the first axial end portion;
      an axial hollow channel portion partially defined in the loading pin and open towards the holding device and through which the joining element is guidable in an axial feed direction toward the holding device,
      a lateral feed opening, defined in a radial side of the loading pin between the first axial end portion and the second axial end portion, and through which the joining element is feedable into the hollow channel portion;
      a one-way passage on the second end portion of the loading pin;
  feeding the joining element into the receiving channel and from there radially through the lateral joining element feed opening into the loading pin;
  turns the joining element as it passes into the axial hollow channel portion; and
  passing a first portion of the joining element through the one-way passage of the loading pin.

* * * * *